(12) United States Patent
Nelson

(10) Patent No.: US 11,069,175 B2
(45) Date of Patent: Jul. 20, 2021

(54) DEVICE ORIENTATION BASED GAMING EXPERIENCE

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/694,805

(22) Filed: Nov. 25, 2019

(65) Prior Publication Data

US 2020/0090451 A1 Mar. 19, 2020

Related U.S. Application Data

(63) Continuation of application No. 15/943,943, filed on Apr. 3, 2018, now Pat. No. 10,529,169.

(51) Int. Cl.
*G07F 17/32* (2006.01)
*G06F 3/01* (2006.01)
*G07F 17/34* (2006.01)

(52) U.S. Cl.
CPC ........ *G07F 17/3209* (2013.01); *G06F 3/017* (2013.01); *G07F 17/3211* (2013.01); *G07F 17/3218* (2013.01); *G07F 17/3262* (2013.01); *G07F 17/3288* (2013.01); *G07F 17/3295* (2013.01); *G07F 17/34* (2013.01)

(58) Field of Classification Search
CPC ............ G07F 17/3209; G07F 17/3211; G07F 17/3218; G07F 17/3262; G07F 17/3288; G07F 17/3295; G07F 17/34; G06F 3/017
See application file for complete search history.

(56) References Cited

U.S. PATENT DOCUMENTS

| | | | | |
|---|---|---|---|---|
| 6,958,757 B2 * | 10/2005 | Karlov | ...................... | G06T 1/60 345/557 |
| 7,644,922 B2 * | 1/2010 | Fiden | .................. | G07F 17/3216 273/138.1 |
| 7,980,954 B2 * | 7/2011 | Gagner | ................... | G07F 17/32 463/42 |
| 8,454,436 B2 * | 6/2013 | Klostermann | ...... | G07F 17/3211 463/31 |
| 9,569,935 B2 * | 2/2017 | Berman | ............. | G07F 17/3265 |
| 9,811,983 B2 * | 11/2017 | Bartosik | ................. | G07F 17/34 |
| 10,242,523 B2 * | 3/2019 | Lyons | ................. | H04L 65/4069 |
| 10,444,985 B2 * | 10/2019 | Bognar | ............... | G05D 1/0227 |
| 2009/0005165 A1 | 1/2009 | Arezina et al. | | |
| 2012/0220363 A1 * | 8/2012 | Bytnar | ................ | G07F 17/3213 463/25 |
| 2012/0329528 A1 * | 12/2012 | Song | ....................... | G06F 3/048 455/566 |
| 2013/0021236 A1 | 1/2013 | Bender | | |

(Continued)

OTHER PUBLICATIONS

Official Action for U.S. Appl. No. 15/943,943, dated Apr. 18, 2019 6 pages.

(Continued)

*Primary Examiner* — Reginald A Renwick
(74) *Attorney, Agent, or Firm* — Sheridan Ross P.C.

(57) ABSTRACT

Disclosed are various embodiments for determining a wagering game to play on a client device. The client device can determine the orientation of a display using one or more sensors. The wagering game can be selected using the orientation. The selected wagering game can be rendered on the display. An outcome of the wagering game can be generated.

12 Claims, 12 Drawing Sheets

(56) References Cited

U.S. PATENT DOCUMENTS

| | | | |
|---|---|---|---|
| 2013/0102390 A1* | 4/2013 | Klein | G07F 17/3211 |
| | | | 463/37 |
| 2013/0310159 A1* | 11/2013 | Froy | A63F 13/327 |
| | | | 463/25 |
| 2014/0256407 A1* | 9/2014 | Graf | G07F 17/3225 |
| | | | 463/22 |
| 2014/0357364 A1* | 12/2014 | Chudek | G07F 17/3211 |
| | | | 463/31 |
| 2017/0024956 A1* | 1/2017 | Hornik | G07F 17/34 |
| 2019/0304243 A1 | 10/2019 | Nelson | |

OTHER PUBLICATIONS

Notice of Allowance for U.S. Appl. No. 15/943,943, dated Sep. 4, 2019 7 pages.

* cited by examiner

DEVICE ORIENTATION BASED GAMING EXPERIENCE

CROSS-REFERENCE TO RELATED APPLICATION

This application is a continuation of U.S. patent application Ser. No. 15/943,943, filed Apr. 3, 2018, the disclosures of each of which is incorporated herein by reference, in its entirety, for all that it teaches and for all purposes.

BACKGROUND

Wagering games can involve reels of indicia spinning into random positions. An award for the wagering game can be determined using the random positions of indicia. Different wagering games can have different mechanisms for providing awards to a patron.
The positions of the indicia can be compared to outcomes in a pay table. For some outcomes, a bonus game can be initiated. The bonus game can award an additional award to a patron.
In a casino, slot machine games are designed with user interface layouts specific for the slot machine hardware the games will be executed on. However, when a mobile device is used, such as a smart phone or tablet, the exact hardware and orientation of the device may vary. The resolution and orientation of a display can impact how user interfaces are rendered on the displays. It would be favorable to customize a gaming experience for the mobile devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
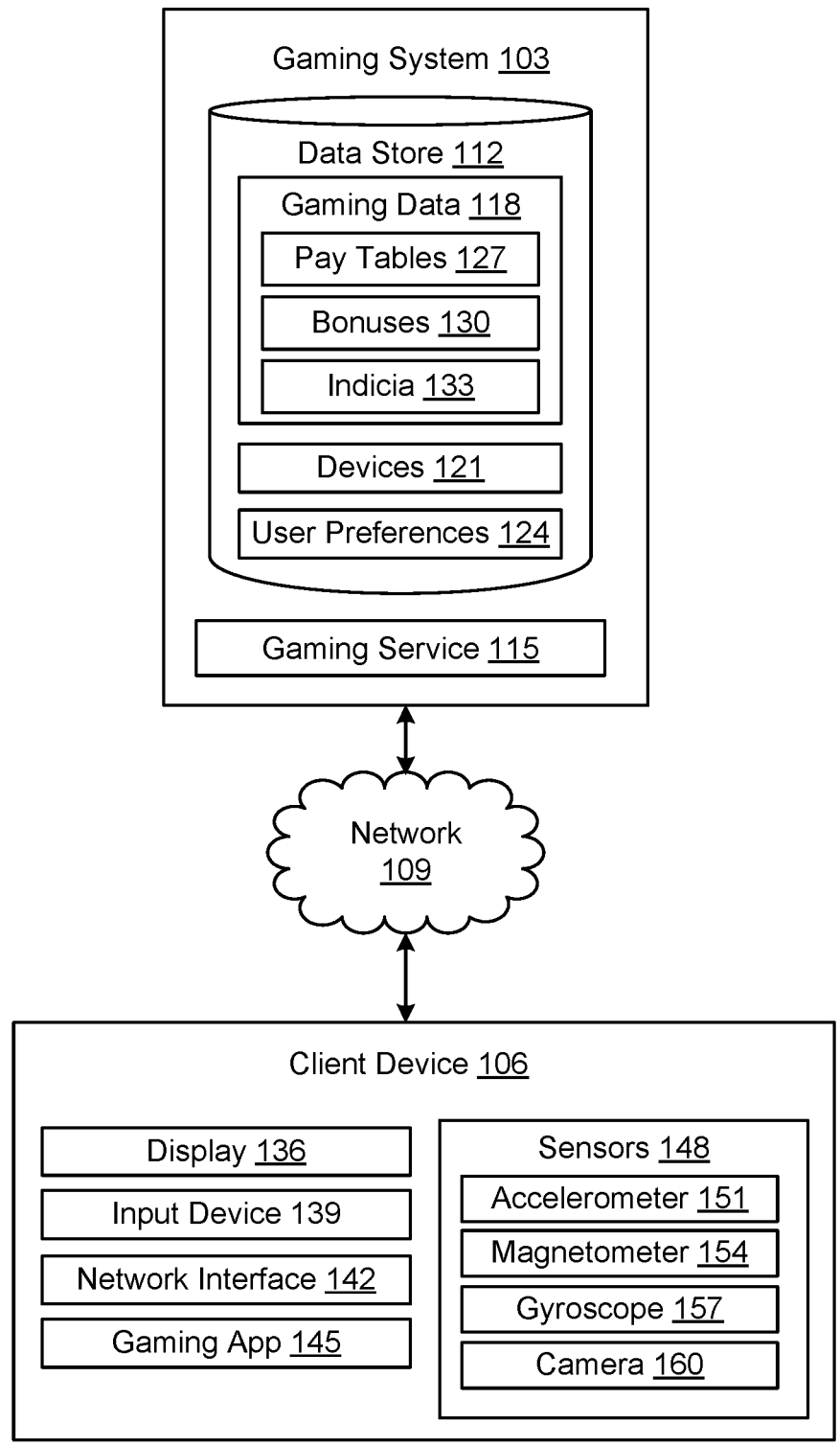
FIG. 1 is a diagram of a gaming environment according to various embodiments of the present disclosure.

Patrons can wager money on casino-owned or personal client devices. The client device can utilize probability to randomly select one of several potential outcomes. Some of the potential outcomes include activating game features or bonus games. Although the outcome of a gaming device is typically out of the hands of a patron, a game feature or bonus game can involve an element of skill or provide a patron with a perception that the game involves skill, which is referred to herein as a pseudo skill.
Client devices such as smart phones and tablets are commonly carried by patrons while playing in a casino or playing online. The client device can include several sensors that detect an orientation of the client device. The configuration of a game playing on the client device can be altered to better fit the orientation of the client device. By using the sensing technology on the client device to determine an orientation, the client device can optimize the gaming experience by providing user interfaces that are better suited for the orientation of the display. The gaming experience can also be improved by facilitating customization of features of a wagering game without requiring the patron to parse through pages of setting menus for the wagering game. For example, a patron can switch from a high volatility wagering game to a low volatility wagering game by rotating the client device to a different orientation. Other aspects of the gaming experience can be customized using the orientation of the client device such as selecting of skill vs. non-skill based gaming, setting a maximum or minimum bet, enrolling in a progressive jackpot, playing single hand or multi-hand card games, or other aspects.
In the following discussion, a general description of the system and its components is provided, followed by a discussion of the operation of the same.
With reference to FIG. 1, shown is an example of a gaming environment 100 according to various embodiments. The gaming environment 100 includes a gaming system 103 and a client device 106, which are in data communication with each other via a network 109. The network 109 can include, for example, Bluetooth, Near Field Communication (NFC), the Internet, intranets, extranets, wide area networks (WANs), local area networks (LANs), wired networks, wireless networks, or other suitable networks, etc., as well as any combination of two or more such networks.
Various applications and/or other functionality may be executed in the gaming system 103 and client device 106 according to various embodiments. Also, various data is stored in a data store 112 that is accessible to the gaming system 103. The data store 112 can be representative of a plurality of data stores 112 as can be appreciated. In some embodiments, one or more data stores 112 can be hosted separate from the gaming system 103. The data stored in the data store 112, for example, is associated with the operation of the various applications and/or functional entities described below.
The gaming system 103 can include a data store 112, a game service 115, and potentially other components. The data store 112 can include gaming data 118 and data related to devices 121 and user preferences 124. The gaming data 118 can include pay tables 127, bonus games 130, indicia 133, and potentially other gaming data. The pay tables 127 can include a list of payouts for a game of chance on the client device 106, such as, for example, a wagering game. The pay tables 127 can include payouts for different combinations of symbols. The bonus games 130 can include various bonus games available on the client device 106. The indicia 133 can include various symbols for the game of chance.

The game service 115 can communicate with a client device 106 to facilitate a wagering game on the client device 106. The wagering game can include games that involve wagering monetary currency, digital credits, social points, pretend money, or other items. The wagering game can include one or more aspect of the game that do not involve wagering. In some embodiments, the game service 115 can determine an outcome of the wagering game on the client device 106. Determining the outcome at the game service 115 can add a layer of protection against hacking of the wagering game from the client device 106. The game service 115 can instruct the client device 106 to load a different wagering game or mode of wagering game based on an orientation of the client device 106. In some embodiments, the game service 115 can provide the client device 106 with two or more versions of a wagering game or bonus game 130 of a wagering game, and the client device 106 can determine which version to load based on an orientation of the client device 106.

The list of devices 121 can include communication information for each client device 106 paired with the gaming system 103. In some embodiments, a history of all client devices 106, including details of the client devices 106, can be stored. The details can include an identifier associated with a pairing of the client device 106 with the gaming system 103, patron information associated with the client device 106, model information for the client device 106, an operating system version and other software version for the client device 106, and other details. In other embodiments, the list of devices 121 can be limited to only currently connected client devices 106 or client devices 106 associated with a current patron.

The list of devices 121 can include metadata and calibration information for client devices 106. The normalization data can include general calibration information that applies to all client devices 106 and specific calibration information that applies to specific client devices 106. As an example, the general calibration information can specify pairing procedures, and security protocols, among other calibration information. The specific calibration information may apply to a single client device 106 or a group of client devices 106, such as, for example, all client devices 106 corresponding to a particular device model or operating system.

The normalization data can specify adjustments to sensor readings from the client device 106. In one embodiment, a calibration procedure for the client device 106 can be performed to determine ranges of measurements for various sensors on the client device 106. Similarly, the calibration procedure can be performed for different models of client devices 106. The model information, ranges of measurements, and other client device information can be stored as metadata in devices 121. The game service 115 can initiate calibrating a client device 106 in response to establishing communications with the client device 106.

The user preferences 124 can include preferred wagering games, preferred bonus games 130, volatility preferences such as preferring high or low volatility, bet amounts, whether or not to participate in skill-based games, preferred denomination, preferred number of paylines, or other user preferences. The user preferences 124 can also store player information, such as a betting history, accumulated points, and other player tracking information. The user preferences 124 can specify when a patron wants orientation changes to alter gaming behavior. For example, a patron can specify that changing an orientation during a base game or a bonus game 130 should be ignored. Alternatively, the patron can specify that the gaming application 145 should scale the graphics of a currently selected wagering game when a change in orientation occurs during game play. As an example, the gaming application 145 can reduce the size of a portrait mode wagering game to fit on a landscape mode orientation when the client device changes.

A patron can customize the effect that changing the orientation has on a wagering game. As an example, a patron can indicate that they prefer a max bet when in portrait mode and a lower bet when in landscape mode. As another example, the patron can indicate they prefer low volatility in landscape mode and high volatility in portrait mode. The patron indication can be stored in user preferences 124, and the gaming application 145 can be configured to select wagering games using the orientation based on the user preferences 124.

The client device 106 is representative of a plurality of client devices that may be coupled to gaming system 103 via the network 109. The client device 106 can include, for example, a processor-based system such as a cell phone, a tablet, a smart phone, a smartwatch, or other processor-based device. Such a processor-based system may be embodied in the form of a smart phone, a tablet, a laptop computer, personal digital assistants, cellular telephones, music players, web pads, game consoles, electronic book readers, or other devices with like capability. The client device 106 can include a display 136, one or more input devices 139, a network interface 142, a gaming application 145, one or more sensors 148, and various other components. The display 136 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The display 136 can have a resolution and an aspect ratio.

The client device 106 can be configured to execute various applications such as a gaming application 145 and/or other applications. The gaming application 145 can be executed in a client device 106, for example, to provide a game of chance such as a wagering game. The game of chance can include a skill-based or pseudo skill-based portion. The gaming application 145 can monitor the sensors 148 to determine an orientation of the client device 106. As an example, the gaming application 145 can determine that the client device 106 and a display 136 of the client device 106 is orientated in a landscape mode or a portrait mode with the landscape mode referring to the client device 106 being horizontally orientated and the portrait mode referring to the client device 106 being vertically orientated. As another example, the gaming application 145 can determine that the client device 106 is oriented in one of a first landscape mode, a second landscape mode, a first portrait mode, or a second portrait mode. The first landscape mode can differ from the second landscape mode by the client device 106 being rotated 180 degrees. Similarly, the first portrait mode can differ from the second portrait mode by the client device 106 being rotated 180 degrees about an axis perpendicular to a plane of the display 136.

The sensors 148 of the client device 106 can include an accelerometer 151, a magnetometer 154, a gyroscope 157, a camera 160, or other sensors. The gaming application 145 or an operating system associated with the client device 106 can determine an orientation of the client device 106 using measurements from the sensors 148. A gaming experience on the client device 106 can be configured using the orientation of the client device 106. The gaming experience can also be configured based on a resolution of the client device 106. In one embodiment, a number of hands of poker in the wagering game can be based on the orientation. As an example, the wagering game can include a greater number of hands of poker when in a portrait orientation of the client device 106 in comparison to a number of hands of poker displayed when in a landscape orientation of the client device 106. In another embodiment, a number of paylines in a first wagering game corresponding to a portrait orientation can be greater than a number of paylines in a second wagering game corresponding to a landscape orientation. In some embodiments, features of the wagering game can be omitted or added based on a resolution or aspect ratio of the client device in addition to the orientation. As an example, a feature may be omitted if a resolution is below a threshold or if an aspect ratio is above a threshold making the feature difficult to render on the display 136.

The wagering game can include a skill-based or pseudo skill-based feature such that the skill of a patron can impact or appear to impact the outcome of the wagering game. The client device 106 can track play of a patron. The gaming application 145 can communicate with one or more gaming systems 103 to track and report game play activity of a patron. The client device 106 can also include a monetary transfer component, such as a wire or other digital money transfer process, such as a mobile wallet functionality, or a credit card processor. The money transfer component can be used by the patron to credit the gaming application 145 with currency. For example, the money transfer component can transfer money to and from a patron's account with a casino.

The camera 160 can be used to scan a barcode of a ticket. Data corresponding to the barcode can be transmitted to the game service 115. The gaming application 145 can verify the barcode with the gaming service 115 to determine whether there is a credit balance associated with the deposited ticket. When the patron wishes to terminate a gaming session, the patron can specify a preconfigured bank account to transfer any remaining balance.

The gaming application 145 can also cause a cash out ticket with a barcode to print to an available printer. This barcode corresponds to data stored in one or more gaming systems 103. The gaming system 103 can associate the monetary value of the credit balance in the gaming application 145 with the barcode data. As will be appreciated by those skilled in the art, mechanisms other than those described herein may be used to cash in or cash out using the client device 106 without departing from the scope of the disclosure.

The client device 106 can be a personal computing device. In some embodiments, the client device 106 can include special purpose hardware to verify that a location of the client device 106 is within a gaming jurisdiction. The special purpose hardware can also enable and verify the secure execution of one or more gaming applications 145 on the client device 106 by the gaming service 115. The verification of the gaming application 145 by the gaming service 115 can enable the server to ensure that gaming applications 145 are not modified by the patron and to prevent cheating. The client device 106 can store the gaming data 118 on a local storage device. In one embodiment, the gaming application 145 can execute in a standalone mode or an offline mode such that the gaming application 145 is not in communication with the gaming service 115. The gaming application 145 can be restricted to a playing a non-monetary version of the wagering game while in standalone mode or the offline mode.

The gaming application 145 can be communicably coupled to a gaming service 115 to facilitate functionality of the wagering game. The gaming application 145 is executed to provide a wagering game, such as for example, a slot game, a card game, a bingo game, or other wagering game. The gaming application 145 can render the wagering game on one or more displays 136. The gaming application 145 can also receive inputs from one or more input devices 139. The input devices 139 can include one or more buttons, one or more touch screen input devices, one or more motion sensors, a mouse, a keyboard, a card reader device, cameras, eye tracking devices, or another input.

Next, a general description of the operation of the gaming application 145 is provided. To begin, the gaming application 145 can generate a user interface corresponding to a game on the display 136. The user interface can include one or more indicia, such as indicia 133. As an example, the indicia 133 can be organized into columns and rows, and the gaming application 145 can provide outcomes of a wagering game in response to a patron placing a bet. The outcome can be determined by the gaming service 115 and transmitted to the gaming application 145. The outcomes can include a base game outcome and a bonus game outcome. In some embodiments, a bonus game 130 can be initiated based on the base game outcome. In one example, if three of a predefined indicia 133 are visible in a base game outcome of the wagering game, a bonus game 130 may be initiated.

The gaming application 145 can determine an orientation of the display 136. The gaming application 145 can alter an orientation of the wagering game rendered on the display 136 based on the physical orientation of the display 136 and/or the client device 106. As an example, the gaming application 145 can identify a position of the client device 106 based on sensor measurements from sensors 148, referred to herein collectively as an orientation sensor.

The gaming application 145 can change an orientation and/or a version of the wagering game rendered on the display 136 in response to a change in the orientation of the client device 106. In some embodiments, the gaming application 145 can ignore changes in the orientation of the client device 106 based on the current mode of the wagering game. In one example, the gaming application 145 can only allow the wagering game to switch versions during a game idle state and prevent the wagering game from switching orientations during game play. In another example, the gaming application 145 can limit the change in the orientation and/or version of the wagering game to a period prior to the start of a base game or the start of a bonus game 130. In this example, once a bet is made to start a base game of the wagering game, a change in the orientation of the client device 106 has no effect until the base game is complete. Further in this example, once the bonus game 130 is started, a change in the orientation of the client device 106 has no effect until the bonus game 130 is complete. In other embodiments, a change in the orientation of the client device 106 at any time during the wagering game can result in a change in an orientation of the wagering game.

The gaming application 145 can determine a wagering game from one or more wagering games based on the orientation. The one or more wagering games can include multiple versions of a single wagering game. For example, the one or more wagering games can include a landscape version of a poker game with five hands being dealt per game and a portrait mode of the poker game with one hand being dealt per game. In this example, the gaming application 145 can select the five hand version of the poker game in response to determining the client device 106 is positioned in a landscape orientation. Similarly, the gaming application 145 can select the one hand version of the poker game in response to determining the client device 106 is positioned in a portrait orientation. The gaming application 145 can determine a first theme of the wagering game when in a portrait orientation and a second theme of the wagering when in a landscape orientation.

The one or more wagering games can include different versions of a wagering game. As an example, based on the orientation of the client device 106, wagering games can have different pay tables 127, different bonus games 130, different bonus features, different bet amounts, different progressive configurations, a different number of hands of a card game, different numbers of reels, different configuration of reels, different currencies, different autohold settings, or other differences. As another example, in one orientation the wagering game can enable access to a standard bonus, while in another orientation, the wagering game can enable access to a communal or shared bonus. The gaming application 145 can contribute to a progressive jackpot in a first orientation and not contribute to the progressive jackpot in a second orientation such that the progressive can only be one in the first orientation.

In one embodiment, the gaming application 145 can automatically select which cards to hold in one orientation while requiring the patron to select when to hold cards in another orientation. In another embodiment, the gaming application 145 can offer hints to help a patron in one orientation and not provide hints in another orientation. For example, one of the orientations can be a learning mode for the wagering game while the other orientation is used after the wagering game is understood.

The gaming application 145 can render a user interface for the determined wagering game. The gaming application 145 can render the user interface on the display 136. In some embodiments, an orientation of the user interface can be rendered on the display 136 in the same orientation as the client device 106. In one example, if the wagering game is restricted to landscape mode, the gaming application 145 can rotate the user interface 180 degrees in response to determining an orientation of the client device 106 switched from a first landscape orientation to a second landscape orientation. In another example, if the wagering game is restricted to portrait mode, the gaming application 145 can rotate the user interface 180 degrees in response to determining an orientation of the client device 106 switched from a first portrait orientation to a second portrait orientation.

The gaming application 145 can alter the wagering game in response to a change in orientation of the client device 106. In one embodiment, the gaming application 145 can set a max bet or minimum bet when the orientation of the client device 106 changes. The minimum and maximum bets available for the wagering game can differ based on the orientation. The gaming application 145 can provide different bet steps for each orientation. For example, in portrait mode the bets can be 5 credits, 25 credits, and 50 credits while in landscape mode the available bets can be 5 credits, 10 credits, 15 credits, 20 credits, 25 credits, and 50 credits.

The gaming application 145 can provide a skill-based or pseudo-skill-based bonus game 130 while in one orientation, while providing a non-skill-based bonus game 130 while in another orientation. As an example, the gaming application 145 can render a skill-based racing game when in a landscape mode and render a slot game or slot based bonus game while in a portrait mode. The slot game or slot-based bonus game can be in the theme of racing to provide consistency through the different orientation modes. In one embodiment, the gaming application 145 can provide a bonus game 130 that multiplies an outcome of a base game of the wagering game by a determined multiplier in a first orientation. A value or range of values for the multiplier or type of multiplier can also differ by orientation of the client device 106. As an example, the portrait mode can provide screen space to show one type of multiplier, while the landscape is better suited to show another type of multiplier. In another orientation, the gaming application 145 can provide an option to select from multiple objects and add an award to the base game outcome based on one or more object selected. The skill-based racing game can be a non-wagering game while the slot game is a wagering game.

In some embodiments, the gaming service 115 can manage the wagering game rendered by the gaming application 145. Although some features discussed herein are indicated as being performed by the gaming application 145, it is appreciated by one of skill in the art that the logic can also be performed at least in part by or in coordination with the gaming service 115. The gaming application 145 can send data indicating an orientation of the client device 106 to the gaming service 115 periodically or when a change occurs in orientation. The gaming service 115 can select an aspect of the wagering game based on the orientation. For example, the gaming service 115 can select a wagering game from one or more wagering games based on the orientation. The outcome of the wagering game can be determined based on the orientation. For example, a pay table 127 and bonus games 130 can be selected based on the orientation which can change the outcome of the wagering game. As another example, a first pay table 127 with a high volatility can correspond to a first orientation of the client device 106 while a second pay table 127 with a low volatility can correspond to a second orientation of the client device 106. As yet another example, because different wagering games can have different outcomes, selecting a wagering game from two or more wagering games based on the orientation can alter the outcome.

The gaming service 115 can cause the user interface corresponding to the wagering game to be rendered by the gaming application 145 on the client device 106. As an example, the gaming service 115 can send an instruction indicating which wagering game to render on the gaming application 145. In some embodiments, the gaming service 115 can stream the wagering game user interface to the gaming application 145, such as, for example, through HTML or a video streaming protocol. In other embodiments, the gaming service 115 can receive commands from the gaming application 145, determine a state of the wagering game, and generate wagering game outcomes based on the commands.

The gaming application 145 can determine a volatility for the wagering game, a graphic theme for the wagering game, a number of reels for the wagering game, a configuration of the reels for the wagering game, a number of paylines for the wagering game, configuration of paylines, a number of hands of a card game, a number of indicia for the wagering game, a maximum bet for the wagering game, or other aspect of the wagering game based on the orientation of the client device 106.

In some embodiments, the gaming application 145 can enable a side bet for the wagering game based on the orientation. As one example, the gaming application 145 can enable a side bet when in a landscape orientation and disable the side bet when in a portrait orientation, or vice versa. In one orientation the gaming application 145 can select the wagering game from a category of skill-based games, while in another orientation the gaming application 145 can select the wagering game from a category of non-skill-based games. In one embodiment, the wagering game is a free-to-play social game in one orientation and a pay-to-play wagering game in another orientation.

In some embodiments, the skill-based or pseudo skill-based wagering game corresponds to a bonus game 130. The gaming application 145 can generate a base game outcome of the wagering game in response to receiving an input from an input device 139. When the base game outcome designates allowing input from the client device 106, the gaming application 145 can result in a skill input mode. When in the skilled input mode, the gaming application 145 can render a user interface requesting the patron to perform a task using the input devices 139 and/or sensors 148.

The gaming application 145 can render a user interface including a selectable option to initiate the wagering game. The gaming application 145 can capture the orientation of the client device 106 at a time when the selectable option is selected. For example, a patron may rotate the client device 106 back and forth from portrait to landscape and vice versa, but if the client device 106 is in portrait mode when the selectable option is selected, the wagering game will be selected based on a portrait mode orientation.

The gaming application 145 can render the wagering game in a first orientation while rendering patron information in a second orientation. The patron information can correspond to an interface to access a player tracking system. For example, the patron information can include a number of points earned by the patron, account information for the patron, game play history of the patron, account management information, and other patron information.

The gaming application 145 can determine capabilities of the client device 106. If an orientation of the client device 106 is not available, the gaming application 145 can select a default orientation. The default orientation can be changed in settings for the wagering game. The gaming application 145 can request permission to change the wagering game when the orientation of the client device 106 changes. The gaming application 145 can store a user preference to change the wagering game when the orientation changes in user preferences 124. The user preference on changing the wagering game can correspond to all wagering games, be specified by a type of wagering game, or be specified on a game-by-game basis. The gaming application 145 can automatically change the wagering game if a user preference 124 indicates the patron prefers to change the wagering game without prompting. In some embodiments, the gaming application 145 can request approval to change particular features of the wagering game. For example, the gaming application 145 can alter a number of rows on a wagering game without permission but request permission or notify the patron when a volatility of the wagering game is changing.

Figure 2:
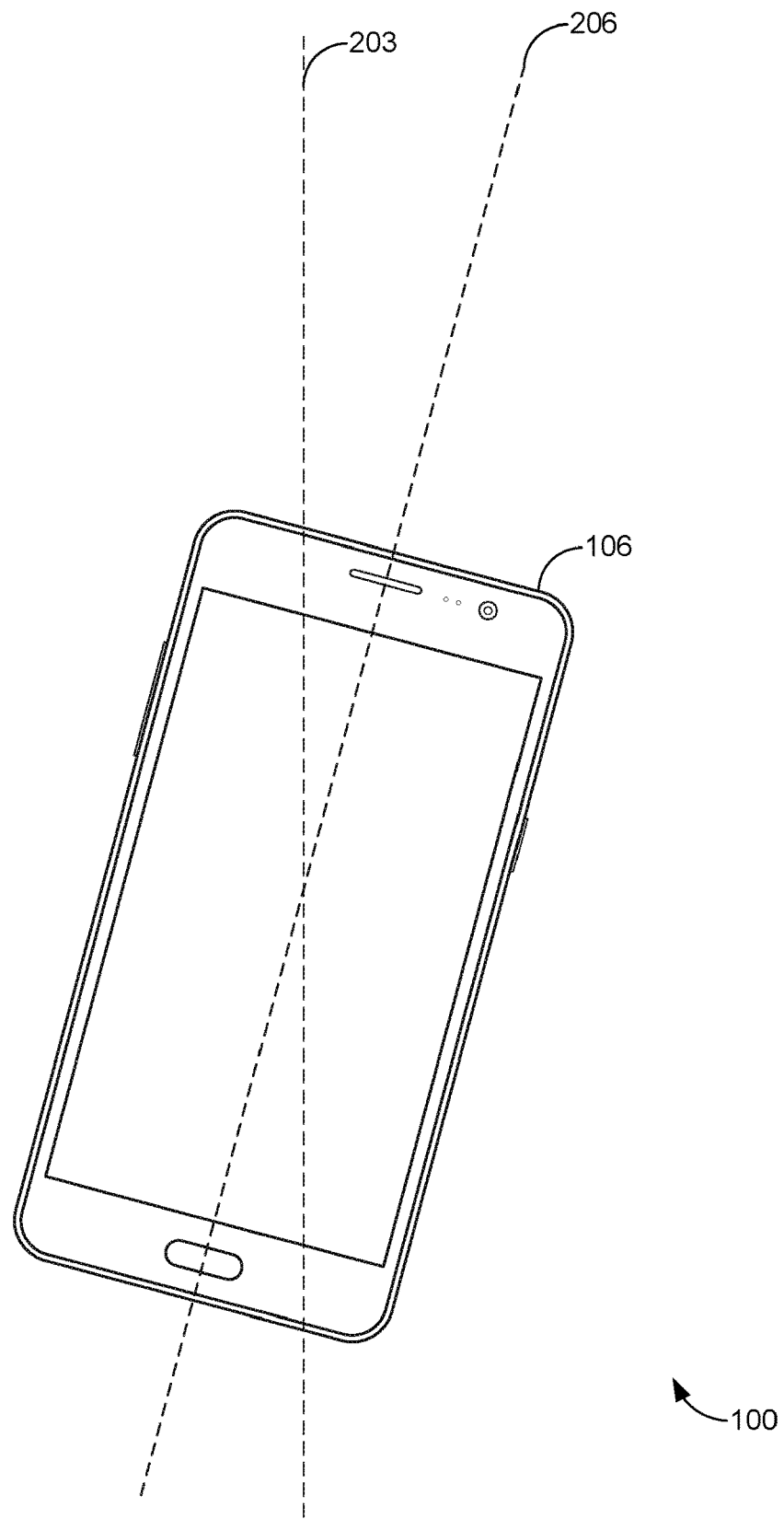
FIG. 2 is a diagram of the gaming environment according to various embodiments of the present disclosure.

With reference to FIG. 2, shown is an example gaming environment 100 including a client device 106 according to various embodiments of the present disclosure. The gaming environment 100 can include a reference axis 203 that is perpendicular to a surface of the earth and a client device axis 206. The client device axis 206 can correspond to a vector passing through a first end and a second end of the client device 106, as shown in FIG. 2. An orientation of the client device 106 can be determined using a delta between the reference axis 203 and the client device axis 206.

In one embodiment, if the client device axis 206 deviates from the reference axis 203 by between −45 degrees (or 315 degrees) and less than 45 degrees, the client device 106 can determine a first portrait orientation. If the client device axis 206 deviates from the reference axis 203 by between 45 degrees and less than 135 degrees, the client device 106 can determine a first landscape orientation. If the client device axis 206 deviates from the reference axis 203 by between 135 degrees and less than 225 degrees, the client device 106 can determine a second portrait orientation. If the client device axis 206 deviates from the reference axis 203 by between 225 degrees and less than 315 degrees, the client device 106 can determine a second landscape orientation. In other embodiments, the first landscape orientation and the second landscape orientation can be considered a single landscape orientation. Similarly, the first portrait orientation and the second portrait orientation can be considered a single portrait orientation. In various embodiments, more than one reference axis and/or client device axis may be used to determine orientation.

Figure 3:
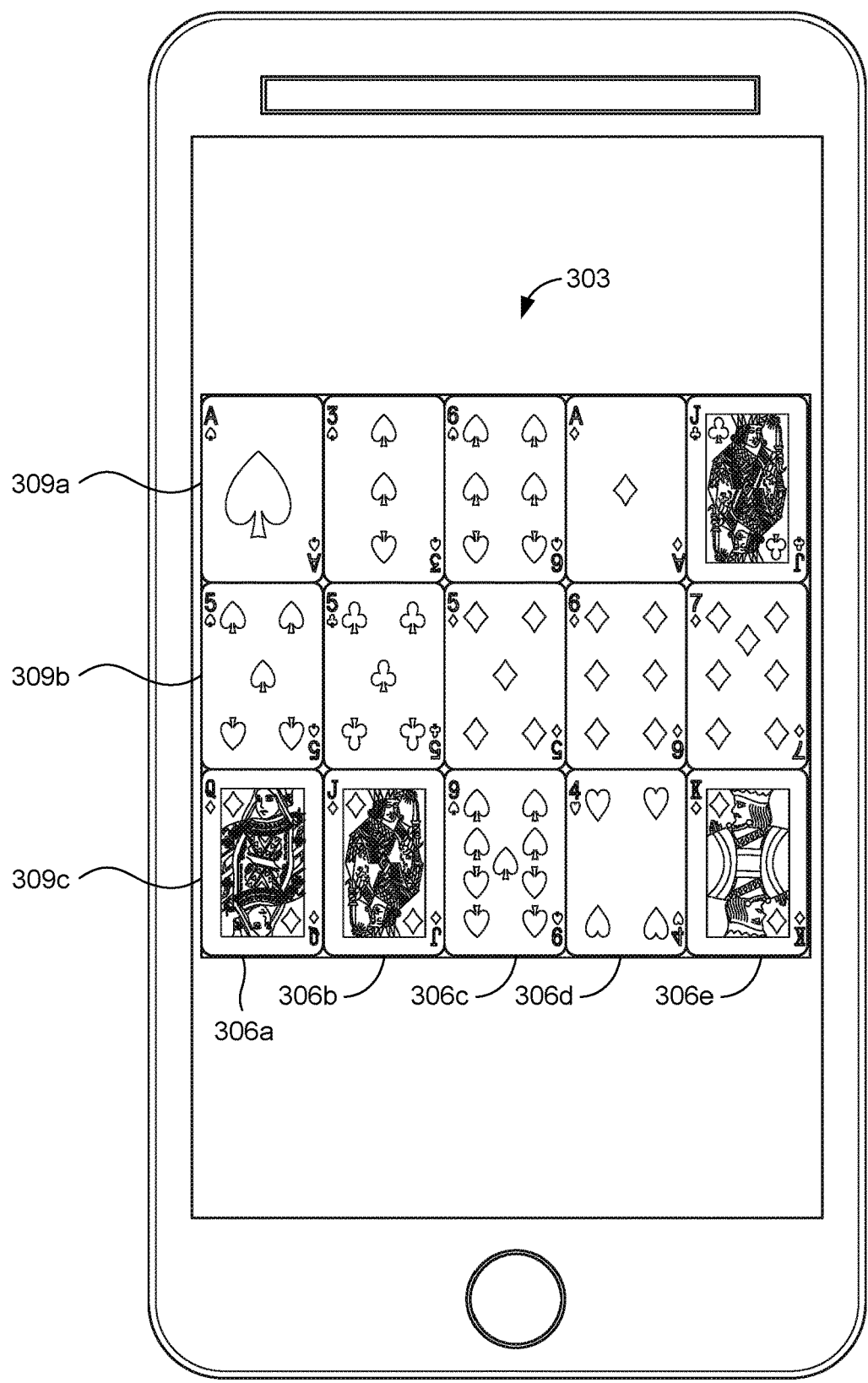
FIG. 3 is a user interface rendered on the client device according to various embodiments of the present disclosure.

Turning to FIG. 3, shown is a user interface 303 rendered on a client device 106 according to various embodiments of the present disclosure. The user interface 303 can include one or more columns of playing cards 306*a-e* and one or more rows of playing cards 309*a-c*. The gaming application 145 can render the user interface 303 on the display 136 when the client device 106 is positioned in a portrait orientation. In one embodiment, the number of columns 306*a-e* can be based on the card game being played. For example, five columns 306*a-e* are shown for a hand of standard video poker. In another embodiment, a number of columns 306*a-e* can be based on the orientation of the client device 106. The number of rows 309*a-c* can be determined based on the orientation of the client device 106. When rows 309*a-c* are stacked vertically, more rows 309 *a-c* can fit on the display 136 when in a portrait mode than in landscape mode.

Figure 4:
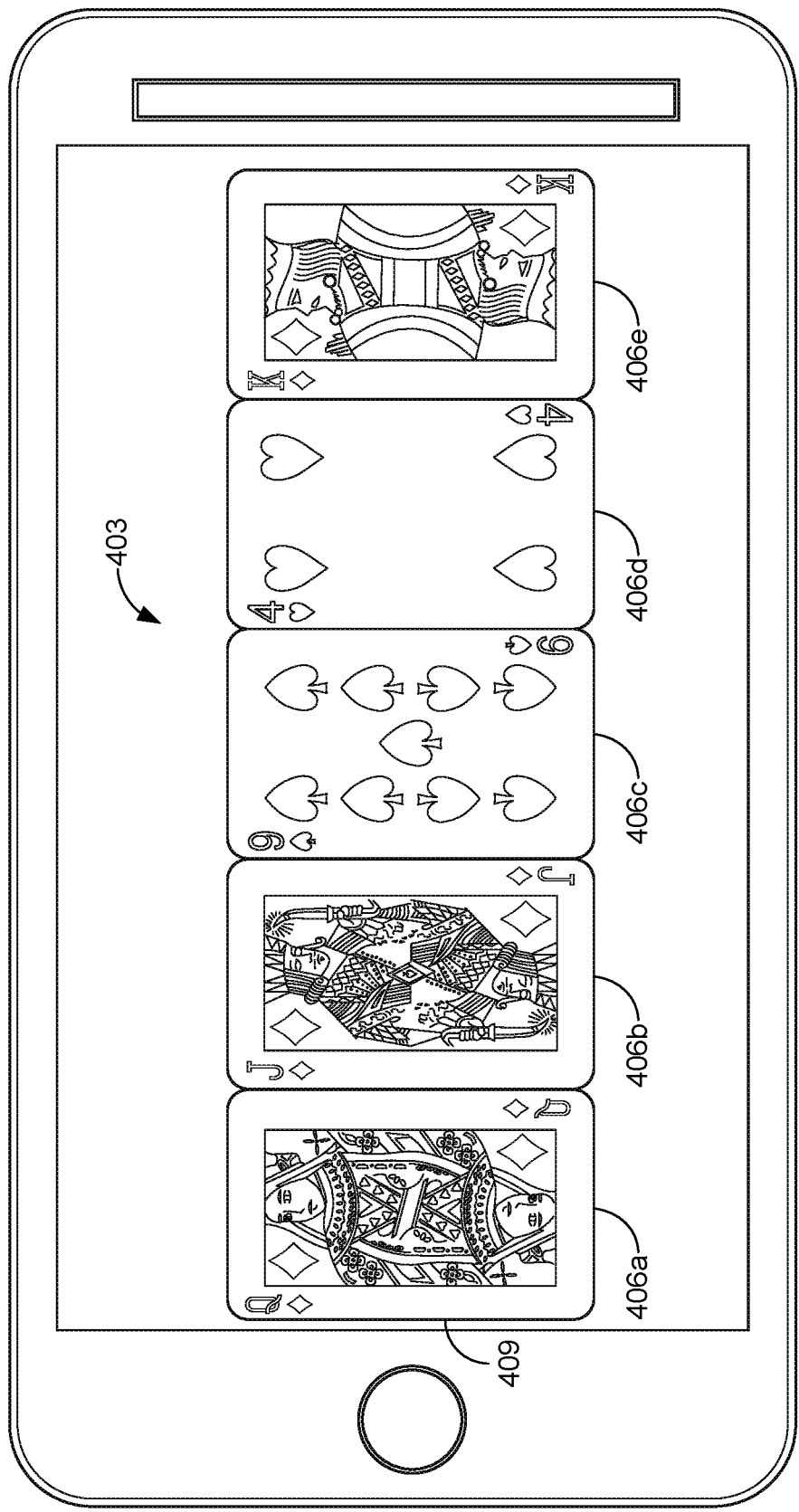
FIG. 4 is a user interface rendered on the client device according to various embodiments of the present disclosure.

With reference to FIG. 4, shown is a user interface 403 rendered on a client device 106 according to various embodiments of the present disclosure. The user interface 403 can include one or more columns of playing cards 406*a-e* and one or more rows of playing cards 409. The gaming application 145 can render the user interface 403 on the display 136 when the client device 106 is positioned in a portrait orientation. In one embodiment, the number of columns 406*a-e* can be based on the card game being played. For example, five columns 406*a-e* are shown for a hand of standard poker. In another embodiment, a number of columns 406*a-e* can be based on the orientation of the client device 106. The number of rows 409 can be determined based on the orientation of the client device. When rows 409 are stacked vertically, less rows 409 can fit on the display 136 when in a landscape mode than rows 309*a-c* (FIG. 3) when in portrait mode.

The gaming application 145 can decide whether to load a wagering game with the user interface 303 or the user interface 403 based on an orientation of the client device 106. As one example, the gaming application 145 can load user interface 303 when in portrait mode and user interface 403 when in landscape mode. In one embodiment, once a hand of cards is dealt, changing the orientation of the client device 106 has no effect until the hand is complete, but can affect the next play of the wagering game.

Figure 5:
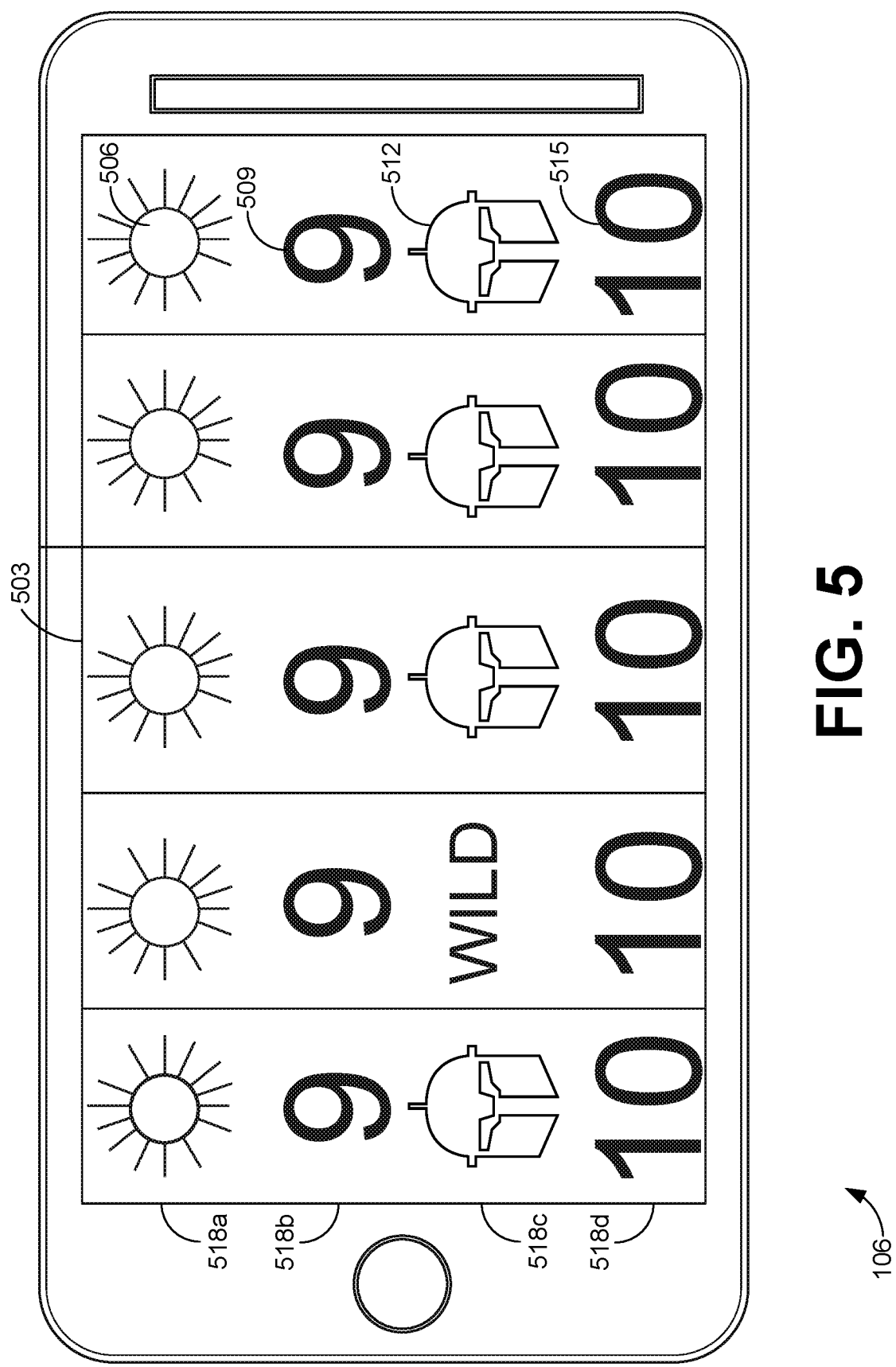
FIG. 5 is a user interface rendered on the client device according to various embodiments of the present disclosure.

With reference to FIG. 5, shown is a user interface 503 rendered on a client device 106 according to various embodiments of the present disclosure. The user interface 503 can correspond to a slot game with a variety of indicia such as indicia 506, 509, 512, and 515. The indicia 506-515 can be arranged in one or more rows 518*a*-518*d*. A count of a number of columns and rows 518*a*-518*d* can be based on an orientation of the client device 106. In one example, the gaming application 145 can select a wagering game with five columns and four rows of indicia 506-515 when the orientation of the client device 106 is in landscape mode.

Figure 6:
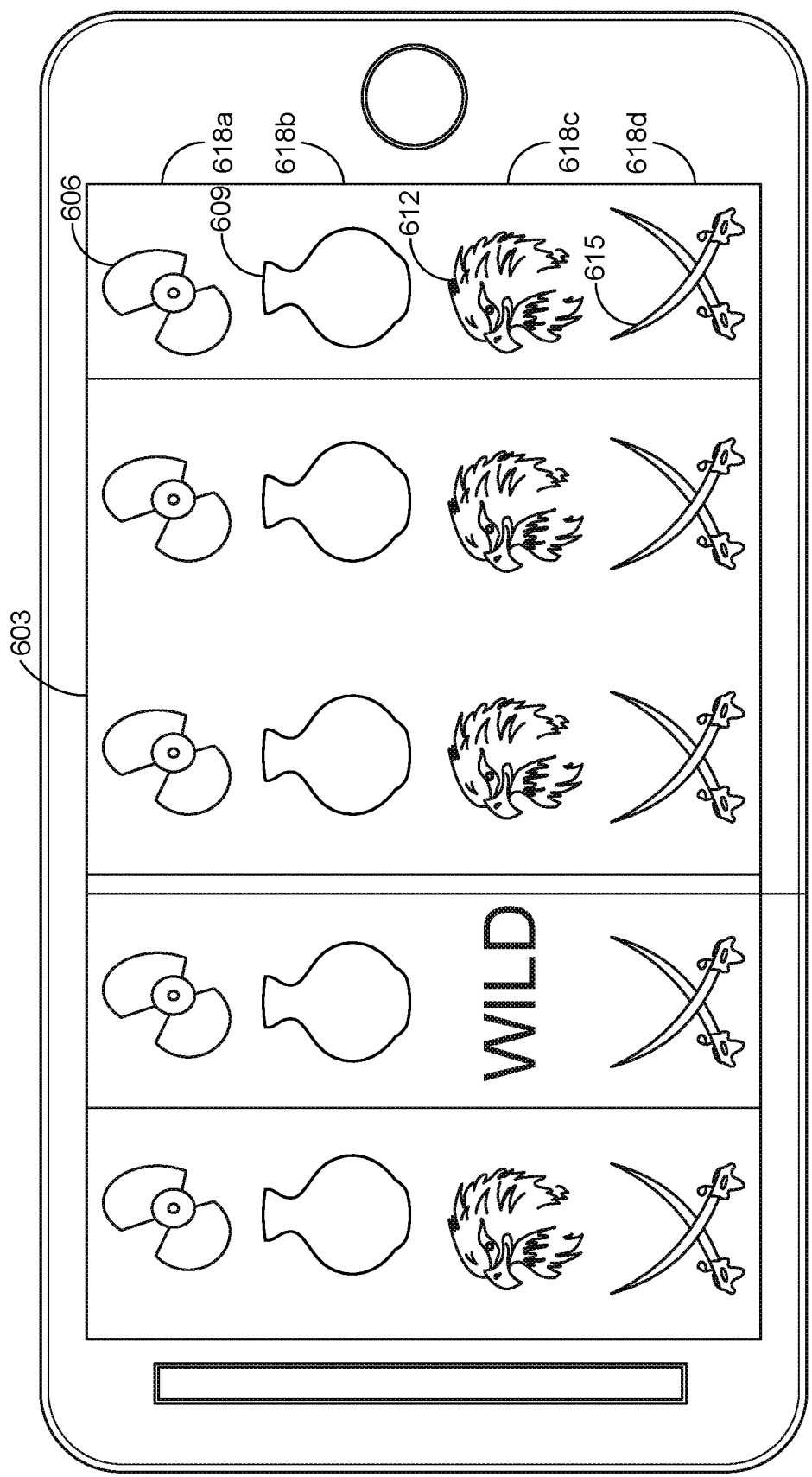
FIG. 6 is a user interface rendered on the client device according to various embodiments of the present disclosure.

With reference to FIG. 6, shown is a user interface 603 rendered on a client device 106 according to various embodiments of the present disclosure. The user interface 603 can correspond to a slot game with a variety of indicia 606, 609, 612, and 615. The indicia 606-615 can be arranged in one or more rows 618a-618d. A number of columns and rows 618a-618d can be based on an orientation of the client device 106. The gaming application 145 can select a theme of the wagering game based on the orientation. As an example, the indicia 506-515 may be selected when the client device 106 is in a first landscape mode, but indicia 606-615 may be selected when the client device 106 is in a second landscape mode. In one embodiment, the gaming application 145 can render a different sets of indicia on the display 136 based on the orientation of the client device 106.

Figure 7:
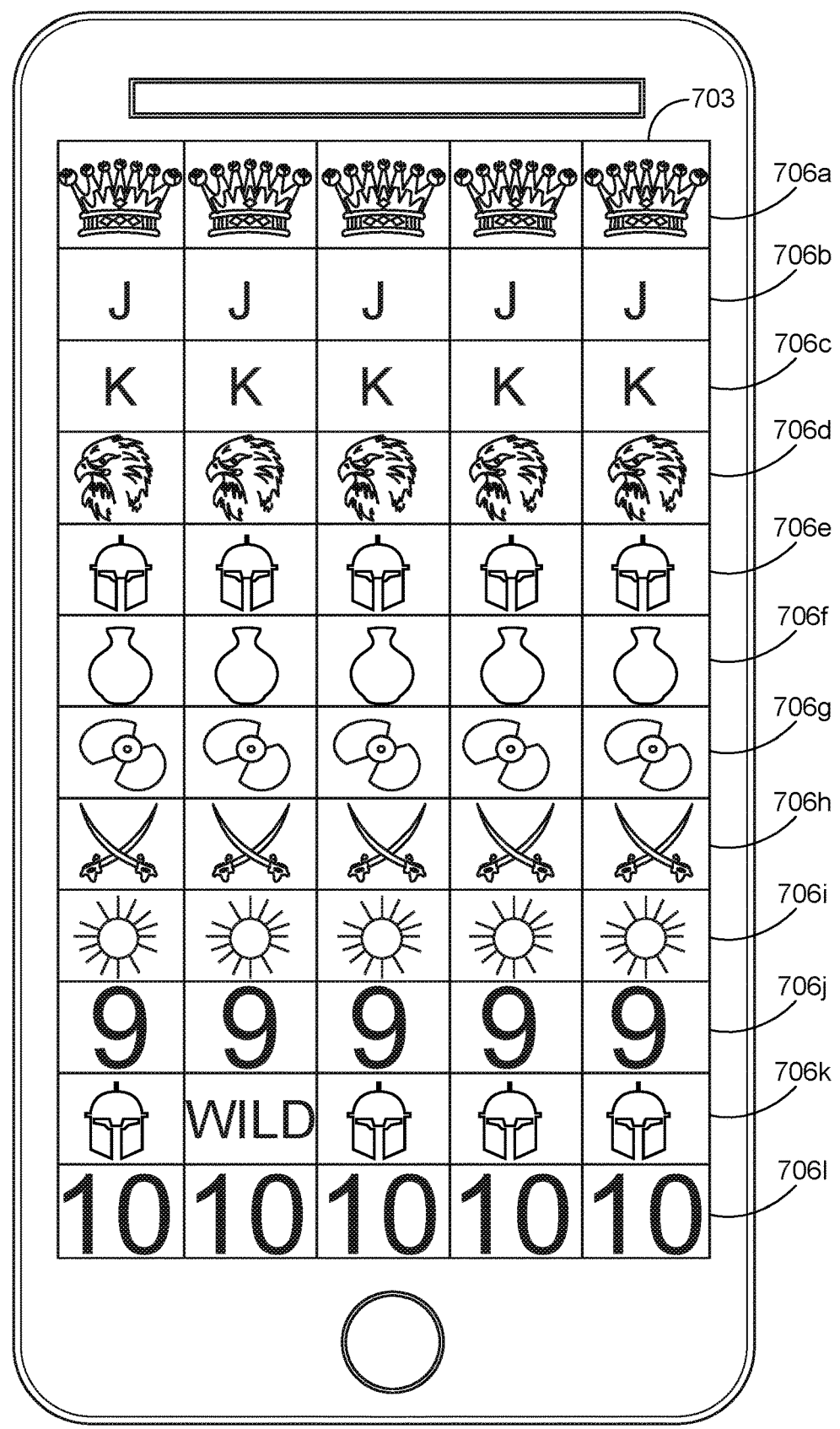
FIG. 7 is a user interface rendered on the client device according to various embodiments of the present disclosure.

With reference to FIG. 7, shown is a user interface 703 rendered on a client device 106 according to various embodiments of the present disclosure. The user interface 703 can include one or more rows 706a-1 of indicia. The gaming application 145 can select a wagering game with a greater count of rows 706a-1 and a greater number of payline combinations for betting when in portrait mode in comparison to landscape mode because of the longer screen size. As an example, user interface 703 is shown with five columns and twelve rows 706a-1 while user interfaces 503 (FIG. 5) and 603 (FIG. 6) shows only four rows 518a-d (FIG. 5) and 618a-d (FIG. 6).

The gaming application 145 can select a first theme for a wagering game when in a first orientation, a second theme for the wagering game when in a second orientation, and a hybrid theme for the wagering game when in a third orientation. As an example, the user interface 503 includes a theme with indicia 506-515 while user interface 603 includes a theme with indicia 606-615. The user interface 703 illustrates a wagering game with a hybrid theme that includes both indicia 506-515 and indicia 606-615.

In one embodiment, the first theme corresponds to a first sports team, the second theme corresponds to a second sports team, and the hybrid theme corresponds to a matchup between the first sports team and the second sports team. In one example, a patron can rotate the client device 106 among the different orientations to change the theme of the wagering game. In another embodiment, the first theme can include a first currency symbol and the second theme can include a second currency symbol. As an example, one theme can have a Dollar sign $ while another can have a Euro sign €. In another embodiment, one theme can show a currency symbol while another theme shows a number of credits.

Figure 8:
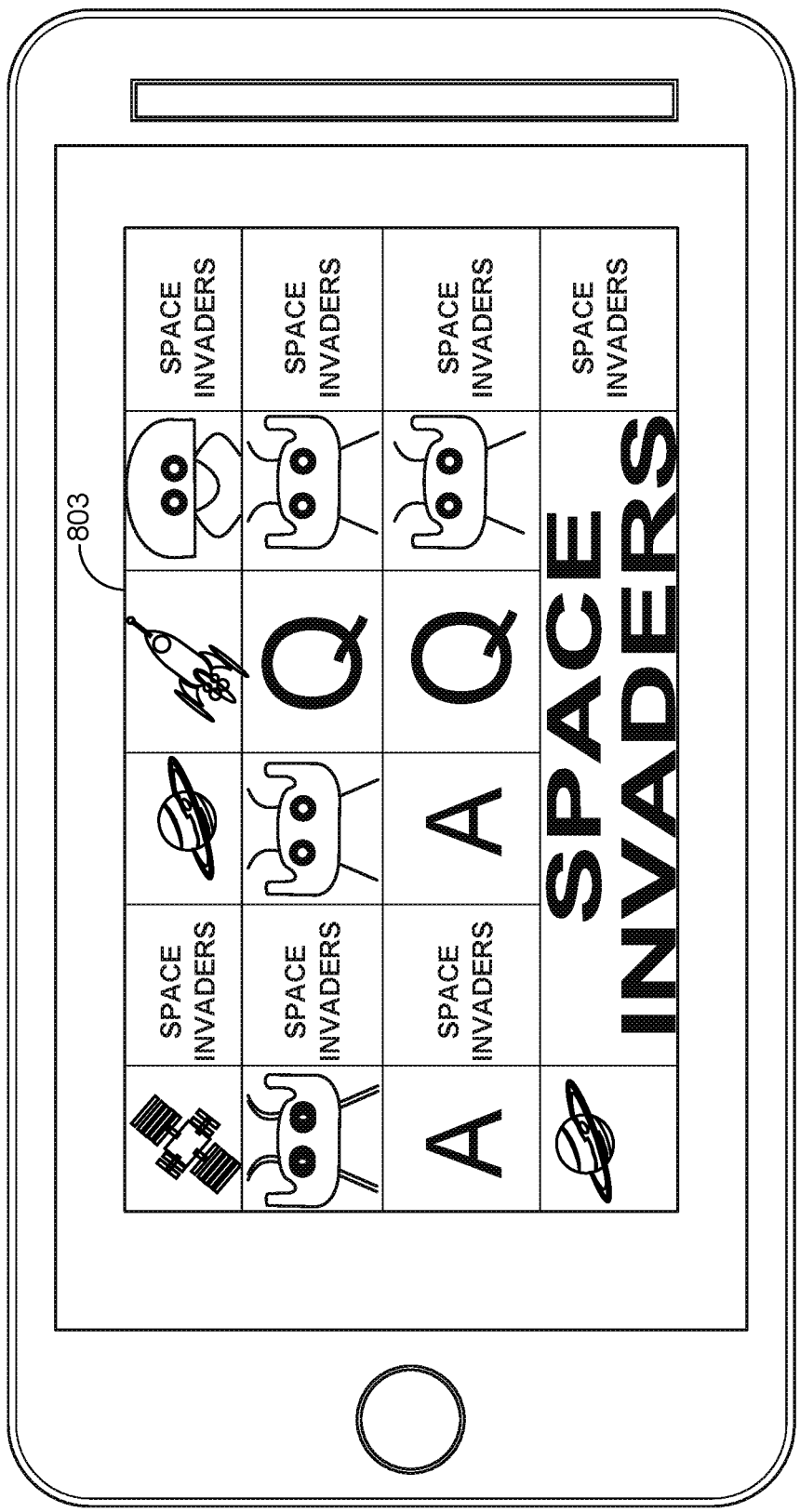
FIG. 8 is a user interface rendered on the client device according to various embodiments of the present disclosure.

With reference to FIG. 8, shown is a user interface 803 rendered on the client device 106 according to various embodiments of the present disclosure. The user interface 803 illustrates a themed slot bonus game 130 in landscape mode. The bonus game 130 can be selected when the client device 106 is in a particular orientation, such as, for example, in landscape mode. The bonus game 130 can correspond to a non-skill based bonus game.

Figure 9:
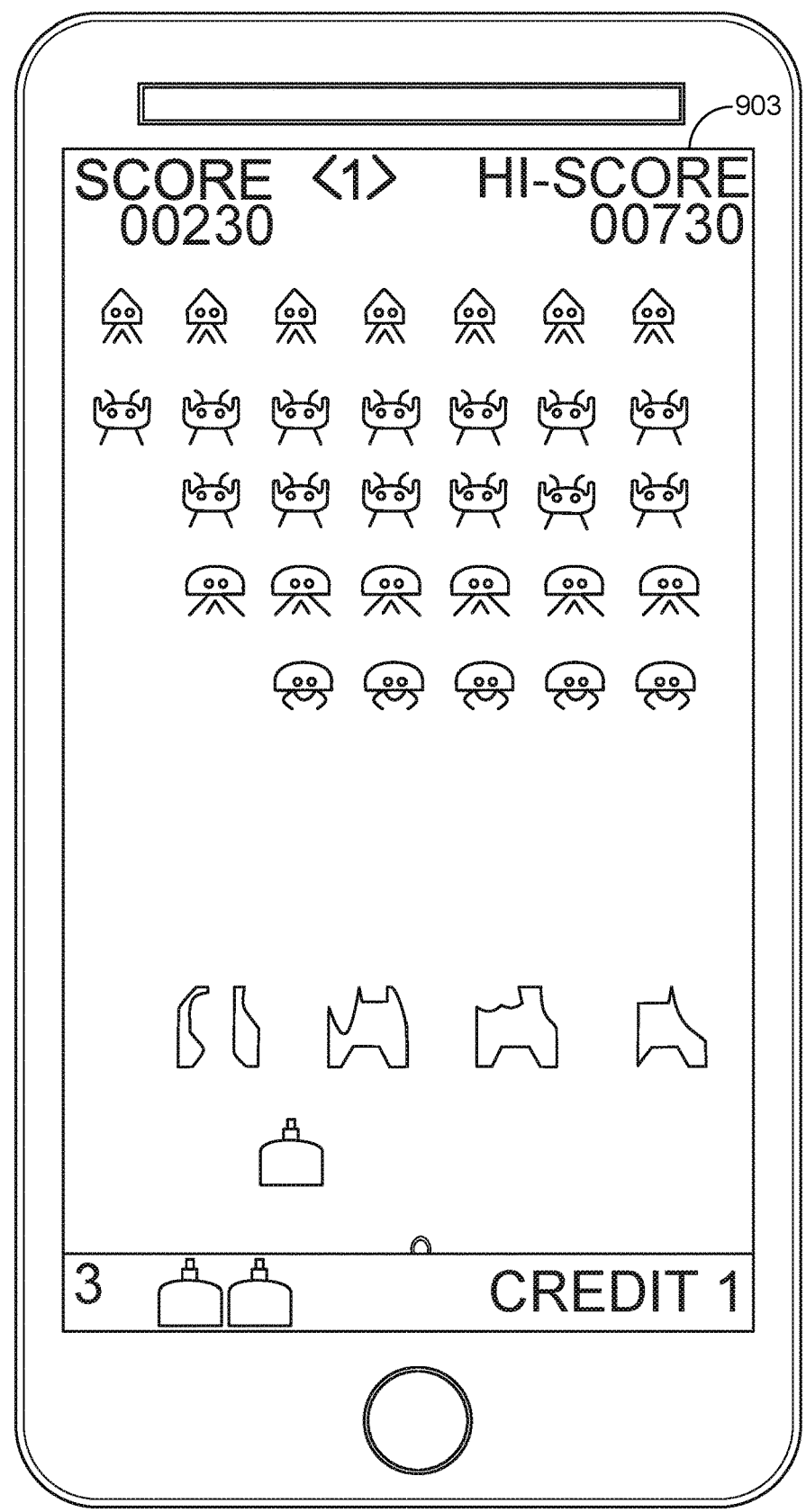
FIG. 9 is a user interface rendered on the client device according to various embodiments of the present disclosure.

With reference to FIG. 9, shown is a user interface 903 rendered on the client device 106 according to various embodiments of the present disclosure. The user interface 903 can include a skill based game or pseudo skill based game, such as, for example, a skill-based bonus game 130. In one example, a patron can control a shooter to destroy figures that decent toward the shooter piece. When a figure is destroyed, a bonus can be awarded. When a bonus game is initiated, the gaming application 145 can instruct a patron to rotate the client device 106 into portrait mode for one type of bonus game or into landscape mode for another type of bonus game. In one example, the gaming application 145 can render the skill-based bonus shown in user interface 903 when in portrait mode and the non-skill-based bonus shown in user interface 803 when in landscape mode.

Figure 10:
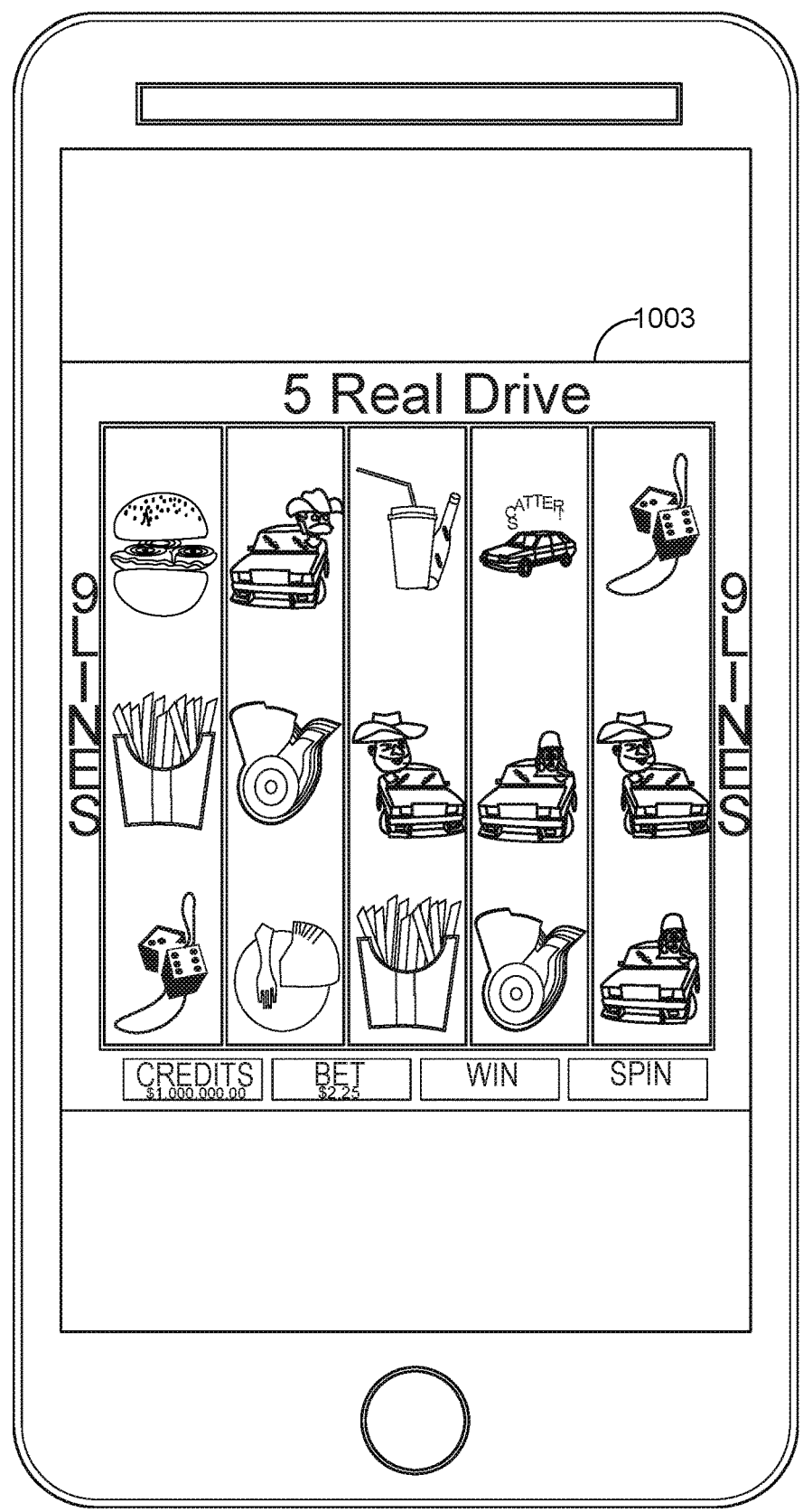
FIG. 10 is a user interface rendered on the client device according to various embodiments of the present disclosure.

With reference to FIG. 10, shown is a user interface 1003 rendered on the client device 106 according to various embodiments of the present disclosure. The user interface 1003 illustrates a themed slot bonus game 130 in a portrait mode. The bonus game 130 can be selected when the client device 106 is in a particular orientation, such as, for example, in portrait mode. The bonus game 130 can correspond to a non-skill based bonus game. In some embodiments, the user interface 1003 can utilize up only a portion of the display 136. In other embodiments, the user interface 1003 can utilize the entire display 136.

Figure 11:
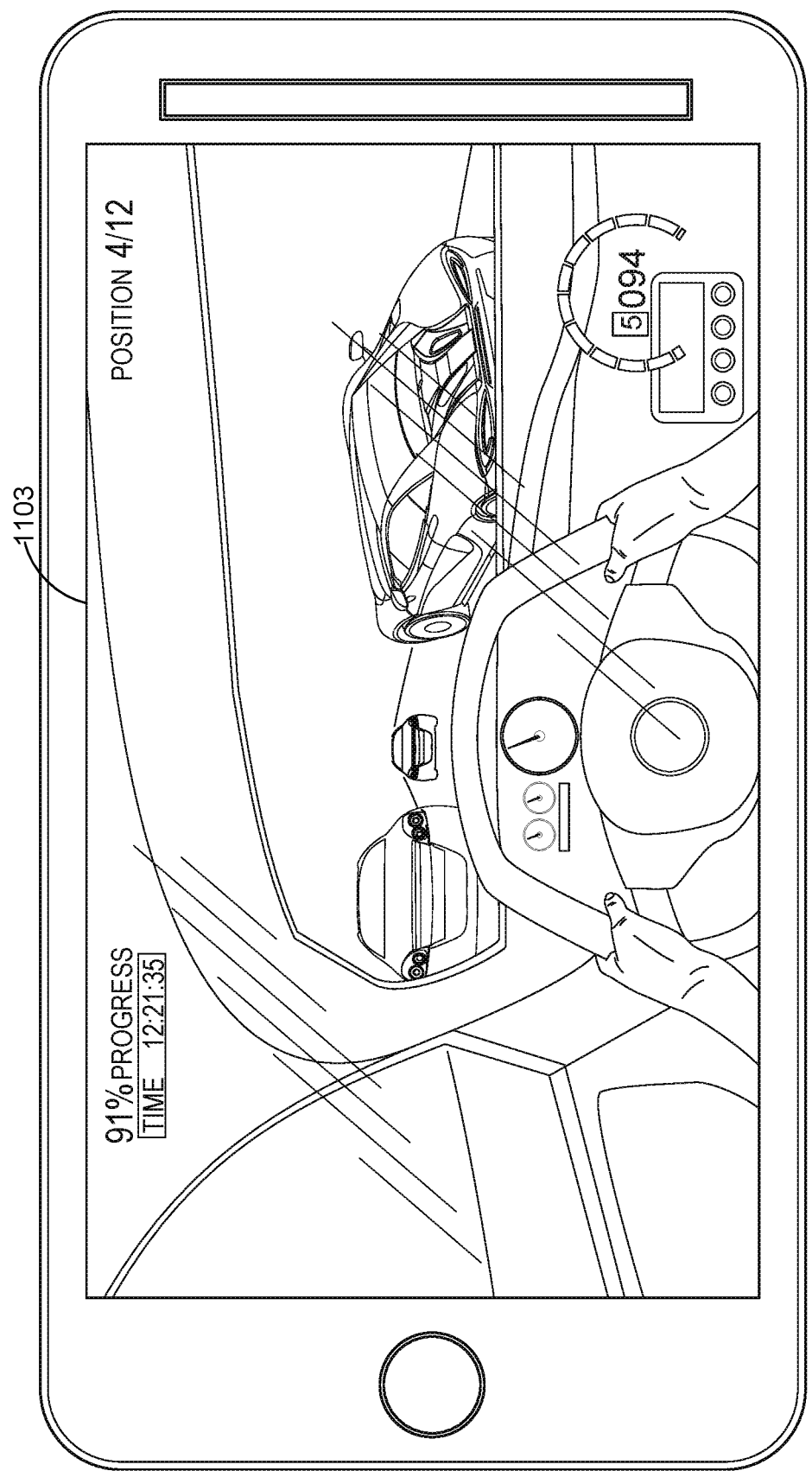
FIG. 11 is a user interface rendered on the client device according to various embodiments of the present disclosure.

With reference to FIG. 11, shown is a user interface 1103 rendered on the client device 106 according to various embodiments of the present disclosure. The user interface 1103 can include a skill-based game, such as, for example, a skill-based bonus game 130. In one example, a patron can control a virtual race car on a virtual track. In one embodiment, a bonus can be awarded based on a speed of the virtual race car completes a lap of the virtual track. In another embodiment, a bonus can be awarded for driving the virtual car into predetermined objects on the virtual race track. The virtual race car can be controlled by tilting the client device 106 to emulate a steering wheel.

When a bonus game is initiated, the gaming application 145 can instruct a patron to rotate the client device 106 into portrait mode for one type of bonus game or into landscape mode for another type of bonus game. In one example, the gaming application 145 can render the skill-based bonus shown in user interface 903 when in portrait mode and the non-skill-based bonus shown in user interface 803 when in landscape mode. The gaming application 145 can monitor the sensors 148 and translate the measurements into steering wheel inputs for the bonus game 130.

Figure 12:
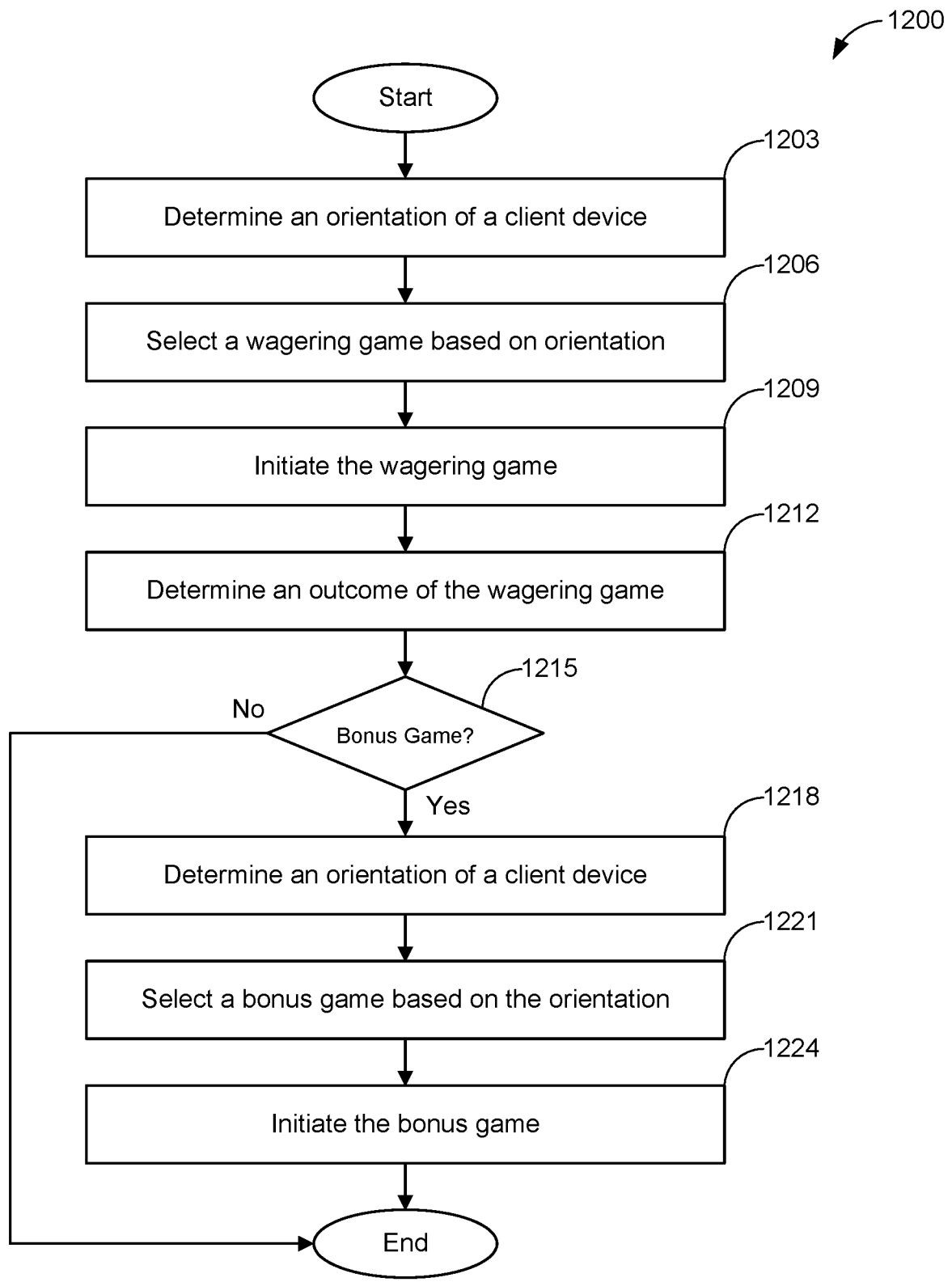
FIG. 12 is a flowchart illustrating one example of functionality implemented as portions of the gaming application executed in a client device in the gaming environment of FIG. 1 according to various embodiments of the present disclosure.

Referring next to FIG. 12, shown is a flowchart of a process 1200 that provides one example of the operation of a portion of the gaming service 115 and the gaming application 145 (FIG. 1) according to various embodiments. It is understood that the flowchart provides merely an example of the many different types of functional arrangements that may be employed to implement the operation of the portion of the gaming service 115 and the gaming application 145 as described herein. As an alternative, the flowchart may be viewed as depicting an example of elements of a method implemented in the gaming environment 100 (FIG. 1) according to one or more embodiments.

Beginning with box 1203, the process 1200 involves determining an orientation of a client device. As an example, the gaming application 145 can determine that a display 136 is orientated in a landscape or portrait mode. In some embodiments, a gyroscope 157 (FIG. 1) can detect a gravity vector corresponding to the client device 106, the magnetometer 154 (FIG. 1) can detect a bearing of the client device 106, and one or more accelerometers 151 can detect acceleration along one or more axes. The magnetometer 154 can be a compass. The client device 106 can process the data from the sensors 148 to determine an orientation of the client device 106.

At box 1206, the process 1200 involves selecting a wagering game based on the orientation of the client device 106. The gaming application 145 can determine to select a wagering game from one or more wagering games based on the orientation. In some embodiments, a respective wagering game is predetermined for to each orientation of the client device 106, and the gaming application 145 selects the predetermined wagering game corresponding to the orientation. In other embodiments, a wagering game is selected by a patron and different versions of the selected wagering game correspond to each orientation of the client device 106.

At box 1209, the process 1200 involves initiating the wagering game. As an example, the gaming application 145 can render a user interface for the wagering game on the display 136. The user interface can include one or more selectable buttons to start the wagering game, adjust a bet of the wagering game, a number of lines bet, and other selectable options. In some embodiments, the selected wagering game can change when the orientation changes until the wagering game is initiated. As an example, if a patron rotates the client device 106 from a portrait mode to a landscape mode prior to initiating the wagering game, the gaming application 145 can select a different wagering game corresponding to the landscape mode.

At box 1212, the process 1200 involves determining an outcome or payout of a wagering game. For example, the gaming application 145 can initiate the reels of a slot machine or deal a hand of cards. The gaming application 145 can determine the outcome based on a pay table 127 (FIG. 1). As an example, if a pay line on a set of reels ends for a wagering game with a certain combination that matches an outcome in the pay table 127, the outcome can be awarded.

At box 1215, the process 1200 involves determining whether a bonus game has been awarded. The gaming application 145 can determine whether the outcome of the wagering game resulted in the award of a bonus game 130. In one embodiment, a bonus game can be awarded based on an outcome of the wagering game matches a predefined outcome in the pay table 127. As an example, one pay table 127 may specify that a bonus occurs if a quantity of a particular indicia occur. In another embodiment, a bonus game can be awarded randomly. If a bonus game 130 has been awarded, the process 1200 proceeds to 1218. Otherwise, process 1200 ends.

At box 1218, the process 1200 involves determining an orientation of the client device. Similar to box 1203, the gaming application 145 can determine an orientation of the client device 106 prior to the start of a bonus game 130. The user interface may specify that a patron can change the orientation of the client device 106 to change the bonus game 130. As an example, while in portrait mode the user interface may have a selectable start button and directions specifying that a skill-based bonus game 130 is available in landscape mode.

At box 1221, the process 1200 involves selecting a bonus game based on the orientation of the client device. Similar to selecting a wagering game in box 1206, the gaming application 145 can select a bonus game 130 based on an orientation of the client device 106.

At box 1224, the process 1200 involves initiating the selected bonus game. The gaming application 145 can start the bonus game 130 selected in box 1221. When the bonus game 130 is complete, the process 1200 ends.

The flowchart of FIG. 12 shows an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart shows a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowchart can be skipped or omitted.

The gaming system 103, the client devices 106, and other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the gaming service 115, the gaming application 145, and/or other components can be stored in one or more storage devices and be executable by one or more processors. The data stored in the storage devices can be encrypted to prevent tampering. The data can also be hashed such that a subsequent hash can be performed to determine if the data has been modified. Also, a data store 112 can be stored in the one or more storage devices.

The gaming service 115, the gaming application 145, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A system, comprising:
a data store; and
a computing device coupled to the data store, the computing device configured to:
receive data describing an orientation of a client device;
determine, based on the orientation of the client device, a number of symbols being displayed in connection with a wagering game;
determine an outcome of the wagering game based at least in part on the determined number of symbols; and
cause the outcome of the wagering game to be presented via a display of the client device.

2. The system of claim 1, wherein the computing device is further configured to:
determine, based on based on the orientation of the client device, a number of reels with which to display the determined number of symbols; and
determine, based on the orientation of the client device, a number of paylines to provide in connection with the wagering game.

3. The system of claim 2, wherein a first number of reels are used to display a first number of symbols when the orientation of the client device is determined to be in a first orientation, wherein a second number of reels are used to display a second number of symbols when the orientation of the client device is determined to be in a second orientation, wherein the first orientation is different from the second orientation, wherein the first number of reels is different from the second number of reels, and wherein the first number of symbols is different from the second number of symbols.

4. The system of claim 1, wherein computing device is further configured to:
determine, based on based on the orientation of the client device, a bonus game to play following the outcome of the wagering game; and
cause the bonus game to be presented via the display of the client device.

5. The system of claim 1, wherein the computing device is further configured to:
determine, based on the orientation of the client device, a pay table to apply to the outcome of the wagering game;
apply the determined pay table to the outcome of the wagering game; and
determine an award based on the application of the determined pay table to the outcome of the wagering game.

6. The system of claim 1, wherein the computing device is further configured to:
cause a plurality of selectable objects to be rendered via a display, each of the plurality of selectable objects corresponding to a respective award;
receive a selection of at least one of the plurality of selectable objects; and
add the respective award for the at least one of the plurality of selectable objects to the outcome of the wagering game.

7. A client device, comprising:
a sensor;
a display;
a processor coupled to the sensor and the display; and
a memory coupled to the processor, wherein the memory includes processor-executable instructions that, when executed enable the processor to:
receive orientation data from the sensor;
receive, based on the orientation data, a number of symbols to display in connection with a wagering game;
receive an outcome of the wagering game based at least in part on the received number of symbols; and
cause the outcome of the wagering game to be presented via the display.

8. The client device of claim 7, wherein the at least one processor is further configured to:
determine, based on the orientation data, a number of reels with which to display the determined number of symbols; and
determine, based on the orientation data, a number of paylines to provide in connection with the wagering game.

9. The client device of claim 8, wherein a first number of reels are used to display a first number of symbols when an orientation of the display is determined, based on the orientation data, to be in a first orientation, wherein a second number of reels are used to display a second number of symbols when the orientation of the display is determined, based on the orientation data, to be in a second orientation, wherein the first orientation is different from the second orientation, wherein the first number of reels is different from the second number of reels, and wherein the first number of symbols is different from the second number of symbols.

10. The client device of claim 7, wherein the at least one processor is further configured to:
determine, based on the orientation data, a bonus game to play following the outcome of the wagering game; and
cause the bonus game to be presented via the display.

11. The client device of claim 7, wherein the at least one processor is further configured to:
reference, based on the orientation data, a pay table to apply to the outcome of the wagering game;
apply the determined pay table to the outcome of the wagering game; and
determine an award based on the application of the determined pay table to the outcome of the wagering game.

12. The client device of claim 7, wherein the at least one processor is further configured to:
render a plurality of selectable objects, each of the plurality of selectable objects corresponding to a respective award;
receive a selection of at least one of the plurality of selectable objects; and add the respective award for the at least one of the plurality of selectable objects to the outcome of the wagering game.

\* \* \* \* \*